(12) United States Patent
Morozov et al.

(10) Patent No.: US 7,184,665 B2
(45) Date of Patent: Feb. 27, 2007

(54) TUNABLE DISPERSION COMPENSATOR

(75) Inventors: Valentine N. Morozov, San Jose, CA (US); Sheldon McLaughlin, Kanata (CA); Thomas Ducellier, Ottawa (CA)

(73) Assignees: JDS Uniphase Inc., Ontario (CA); JDS Uniphase Corporation, Milpitas, CA (US)

( * ) Notice: Subject to any disclaimer, the term of this patent is extended or adjusted under 35 U.S.C. 154(b) by 995 days.

(21) Appl. No.: 10/163,574

(22) Filed: Jun. 7, 2002

(65) Prior Publication Data

US 2002/0186438 A1    Dec. 12, 2002

Related U.S. Application Data

(60) Provisional application No. 60/350,432, filed on Jan. 22, 2002, provisional application No. 60/296,444, filed on Jun. 8, 2001.

(51) Int. Cl.
*H04J 14/02* (2006.01)
*H04B 10/12* (2006.01)

(52) U.S. Cl. .................. 398/81; 398/149; 398/150; 398/147

(58) Field of Classification Search .............. 398/81, 398/150, 147, 149
See application file for complete search history.

(56) References Cited

U.S. PATENT DOCUMENTS 5,166,818 A     11/1992  Chase et al. ............... 359/170
5,572,355 A     11/1996  Cotton et al. ............. 359/333
5,930,045 A      7/1999  Shirasaki ................. 359/577
6,392,807 B1     5/2002  Barbarossa et al. ........ 359/578
6,636,662 B1*   10/2003  Thompson et al. .......... 385/27
6,892,003 B2*    5/2005  Katayama et al. .......... 385/39

OTHER PUBLICATIONS

"A tunable dispersion compensating MEMS all-pass filter"; Madsen et al.; Photonics Technology Letters, IEEE vol. 12, Issue 6, Jun. 2000; pp. 651-653.*
Quintic-phase-limited, spatially uniform expansion and recompression of ultrashort optical pulses, Lemoff et al, Oct. 1, 1993, vol. 18. No. 19, Optics Letters, Optical Society of America, pp. 1651-1653.
3000 Times Grating Compressor With Positive Group Velocity Dispersion: Application to Fiber Compensation in 1.3-1.6 μm Region, O. Martinez, IEEE Journal of Quantum Electronics, vol. QE-23, No. 1, Jan. 1987, pp. 59-64.

* cited by examiner

*Primary Examiner*—Jason Chan
*Assistant Examiner*—Nathan Curs
(74) *Attorney, Agent, or Firm*—Allen, Dyer, Doppelt, Milbrath & Gilchrist, P.A.

(57) ABSTRACT

A chromatic dispersion compensator in a single-pass and a double-pass version is disclosed. In a single-pass version, the compensator has a diffractive grating for spatially separating an input optical signal into spatially spaced frequency components and a MEMS array of separate phase shifters, each for imparting an independent phase shift to a channel containing a range of the spatially spaced frequency components. In a double-pass version, a retroreflector is disposed to effect a double pass of the light beam through the grating and the phase shifters. The arrangement is effecting in reducing chromatic dispersion of the optical signal.

9 Claims, 12 Drawing Sheets

TUNABLE DISPERSION COMPENSATOR

This application claims priority benefit of U.S. provisional applications No. 60/296,444 filed Jun. 8, 2001 and No. 60/350,432 filed Jan. 22, 2002.

FIELD OF THE INVENTION

This invention relates to chromatic dispersion, and more specifically to compensating for chromatic dispersion in optical waveguides.

BACKGROUND OF THE INVENTION

Fiber optic systems have become widely used for high capacity telecommunications networks. In fiber optic systems, data is typically transmitted as a stream of light pulses, within an optical spectrum covering some range of optical frequencies around a central frequency. Such a stream of pulses is known as a "channel". The capacity of fiber optic communications systems has been increased both by increasing the data rate for each channel, and by multiplexing channels at different wavelengths onto a single optical fiber (known in the art as Wavelength Division Multiplexing, or WDM). Future fiber optic networks are also envisioned to be "agile", with the capability of adding and dropping optical channels at intermediate nodes in a network, and dynamically reconfiguring the optical paths through the network taken by each channel. These advanced networks require careful management of the distortions to optical pulses caused by propagation through optical fibers.

An optical pulse propagates through an optical system at a velocity known as the group velocity. The time delay for a pulse to propagate through an optical system is known as the group delay. For optical fibers, the group velocity varies with wavelength, such that the longer wavelength components of an optical pulse propagate slightly faster or slower (depending on the sign of the chromatic dispersion) than the shorter wavelength components. This typically leads to a broadening in time of an optical pulse propagating through an optical fiber. This broadening is known as chromatic dispersion. As the pulses broaden, they eventually overlap in time, and can no longer be distinguished at an optical receiver. Thus, chromatic dispersion represents one of the fundamental limitations to the maximum data rates and transmission distances which can be achieved in a fiber optic communications system.

In the art, chromatic dispersion D is conventionally defined as the derivative of group delay $\tau_g$ with respect to wavelength $\lambda$: $D = d\tau_g/d\lambda$. Group delay is in turn defined as the negative of the derivative of optical phase $\phi$ with respect to frequency $\omega$: $\tau_g = -d\phi/d\omega$. Chromatic dispersion is conventionally expressed in units of ps/nm, and group delay in units of ps.

In order to increase the data rates and transmission distances in a fiber optic network, one or more chromatic dispersion compensator devices are typically included in the network. The chromatic dispersion compensator is designed to create a chromatic dispersion opposite in sign and at least approximately equal in magnitude to the chromatic dispersion of a segment of the network. The function of the chromatic dispersion compensator is to undo the pulse distortion caused by propagation through the fiber optic network Chromatic dispersion compensator devices can be broadly classified as either single or multi-channel, and either fixed or tunable. Single channel devices compensate chromatic dispersion for a single optical channel, while multi-channel devices operate simultaneously on a plurality of channels. For fixed chromatic dispersion compensators, the amount of chromatic dispersion is fixed at the time of manufacture or installation, while for tunable dispersion compensators, the amount of dispersion may be dynamically adjusted during operation of the network.

For WDM fiber optic systems, it is desirable to have multi-channel dispersion compensators, in order to avoid the cost and complexity of demultiplexing the WDM channels and routing each channel through a separate single channel dispersion compensator.

In general, the required amount of chromatic dispersion compensation may vary from one WDM channel to another, due for example to the variation of chromatic dispersion with wavelength for optical fibers, or due to a different routing through the fiber optic network for different optical channels. The required amount of chromatic dispersion compensation may also vary with time, due for example to changes in the chromatic dispersion of the fiber links with ambient temperature, or due to dynamic re-routing of optical channels through the network. Thus, it is desirable to have a chromatic dispersion compensator that can impart separately and dynamically adjustable amounts of compensation to each channel.

U.S. Pat. No. 5,166,818 issued to Chase et al. discloses a dispersion compensating device based on the principle of spatially separating the frequency components of a single optical channel, applying a phase correction to the frequency components, then recombining the frequency components. The application of this device is limited, since it operates only on a single optical channel, and because the optical passband narrows as the amount of chromatic dispersion increases.

U.S. Pat. No. 6,392,807 issued to Barbarossa et al. discloses a tunable chromatic dispersion compensator based on the Virtually Imaged Phased Array (VIPA). This device is capable of simultaneously compensating chromatic dispersion for a plurality of channels, but it is limited in application by the fact that it cannot adjust the chromatic dispersion of each channel separately. Instead, the tuning mechanism adjusts the chromatic dispersion of all channels together.

It is an object of the present invention to provide a chromatic dispersion compensator that would perform simultaneous chromatic dispersion compensation for multiple channels, with separately adjustable compensation for each channel. A method for widening and flattening the optical passband of such a device is also envisaged.

SUMMARY OF THE INVENTION

In accordance with one aspect of the invention, herein denoted as a "single pass" version, there is provided a chromatic dispersion compensator comprising: a dispersive means for spatially separating an input optical signal into spatially spaced frequency components, and a plurality of separate phase shifters, each disposed for imparting a phase shift to a channel containing a range of the spatially spaced frequency components. The compensator may further have means for recombining the spatially spaced frequency components into a single output signal.

The plurality of phase shifters may be embodied by a MEMS mirror array or by lenses.

The mirrors in the array may be deformable mirrors. Control means may be provided for adjusting the shape and position of the deformable mirrors. Alternatively, the mirror array may comprise fixed mirrors.

In one embodiment, the dispersive means is a diffraction grating, either transmissive or reflective. The reflective grating may have a concave shape to facilitate the focusing of the diffracted light beams.

Collimating means, e.g. a lens or a mirror may be provided for directing the input signal to the diffraction grating (dispersive means).

The compensator may further comprise a focusing means for focusing the separated frequency components onto the separate phase shifters.

In another aspect of the invention, denoted as a "dual-pass" compensator, a chromatic dispersion compensator comprises:

an input port for inputting an input optical signal,
a first dispersive means optically coupled for spatially separating the input optical signal into spatially spaced frequency components,
at least one phase shifter optically coupled for imparting a phase shift to a range of the spatially spaced frequency components,
a second dispersive means optically coupled for recombining the spatially spaced frequency components into a first output signal,
a retroreflecting means coupled to redirect the first output signal back to the second dispersive means to undergo a second pass to the at least one phase shifter and a second pass to the first dispersive means to produce a second output signal, and
an output port for outputting the second output signal,
wherein the arrangement is such that an input signal is directed to the first dispersive means, the spaced frequency components are directed to the at least one phase shifter, the phase-shifted components are directed to the second dispersive means to produce a first output signal which is redirected by the retroreflecting means for a second pass to the second dispersive means, the phase shifter, the first dispersive means and to the output port.

The first and second dispersive means may be a single dispersive means as shown in FIG. 7a or may be separate dispersive means 16a and 16b as shown in FIG. 7b.

The at least one phase shifter may be a plurality of separate phase shifters. Each separate phase shifter may be adapted for imparting a phase shift to a channel containing a range of the spatially spaced frequency components, independently of the other phase shifters.

The retroreflecting means may be a mirror (flat or spherical) or a prism.

According to the invention, two configurations of multi-channel chromatic dispersion compensator devices are provided. The two configurations are referred to as "single pass" and "dual pass" devices.

The "single pass" device consists generally of a means of collimating an input optical beam received from an optical fiber (e.g. with a spherical mirror), spatially separating the optical frequency components of the beam (e.g. with a diffraction grating), focusing these sub beams of different frequency components (e.g. with a spherical mirror) onto an array of phase filters (herein also termed "phase shifters"), arranged such that there is one phase filter element for each channel or group of adjacent channels, recollimating the sub-beams (e.g. with a spherical mirror) after the phase filters, recombining the frequency components into a single beam (e.g. with a diffraction grating), and focusing the beam into an optical fiber (e.g. with a spherical mirror). Each phase filter in the array is designed to generate a frequency dependent phase shift across one optical channel or group of adjacent optical channels, such that the phase shift substantially cancels a phase distortion in the input optical signal. This phase shift arises from a variation of the optical path length of the phase filter element with position along the dispersion direction. Each phase filter may be separately and dynamically adjustable using various control means.

The dual pass configuration is similar to the single pass configuration, except that after the frequency components are recombined (e.g. by a grating), they are retro-reflected (e.g. by a plane mirror perpendicular to the beam). The light beams then retrace their path through the device, with a second separation into frequency components, a second focusing onto the phase filter (phase shifter) array, a second recombination of the frequency components into a single beam, and finally focusing back into an optical fiber. Compared to the single pass device, the dual pass configuration doubles the phase shift, and cancels an angular error that causes an excess coupling loss into the output optical fiber.

BRIEF DESCRIPTION OF THE DRAWINGS

The invention will be described in more detail by way of the following description in conjunction with the drawings, in which like reference numerals denote like elements throughout the figures, and in which.

DETAILED DESCRIPTION OF THE INVENTION

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Single-pass Dispersion Compensator

Figure 1:
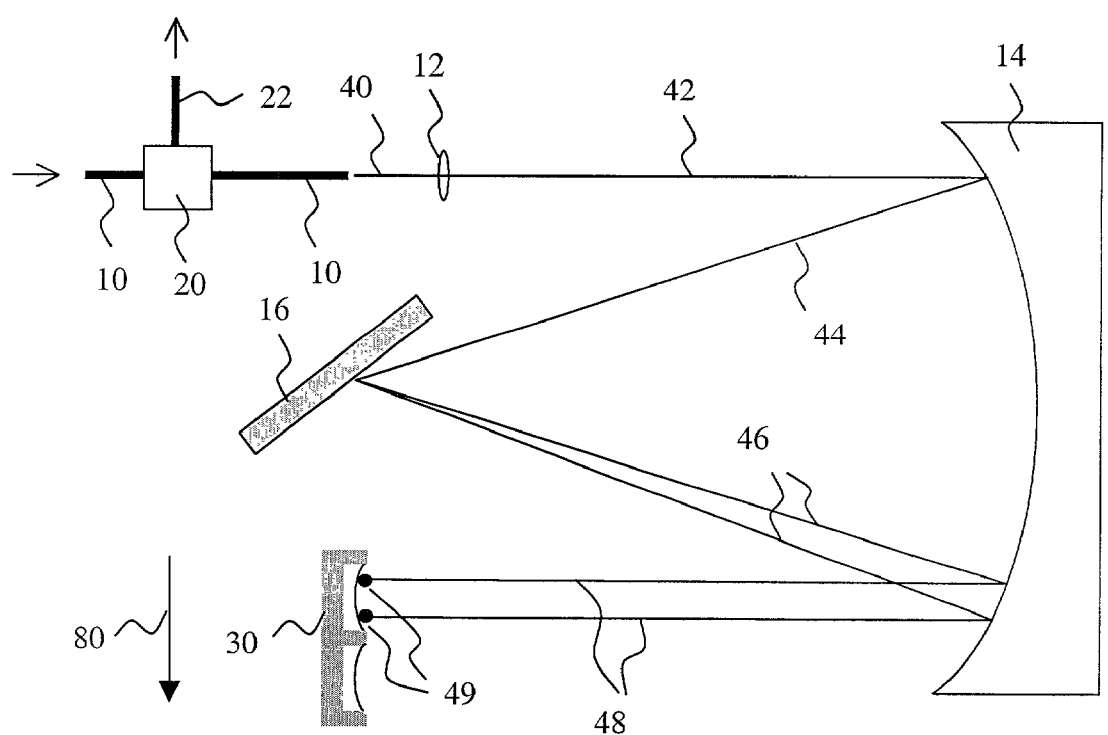
FIG. 1 is a schematic diagram of a preferred embodiment of a chromatic dispersion compensator device in which light is reflected once from an array of phase shifters, showing representative light paths from an input optical fiber to the array of phase shifters.

In an embodiment of the single pass chromatic dispersion compensator, illustrated in FIG. 1, optical signals enter the device from an optical fiber 10. The beam waist size of the light beam 40 from the input fiber is expanded with a micro-lens 12 or a plurality of lenses. The optical beam 42 from the micro-lens 12 is substantially collimated with a spherical mirror 14, and directed toward a diffraction grating 16. The collimated beam 44 incident on the diffraction grating 16 is spread into a plurality of reflected collimated sub-beams 46 of the different optical frequency components of the incident beam, with an angular separation between sub-beams of different frequency components. This angular spreading of optical frequency components is referred to as an "angular dispersion". The spherical mirror 14 transforms the plurality of collimated sub beams 46 to a plurality of focused sub-beams 48 that converge to a plurality of focused spots 49. The focused spots 49 are located substantially along a line, so the spreading of focused spots of different frequency components is referred to as a "linear dispersion", and the direction of the line is referred to as the "linear dispersion direction" 80. A reflective MEMS membrane array 30, hereinafter referred to as the "MEMS array", is disposed at or near the line of focused spots 49. The distance from the grating 16 to the spherical mirror 14 is at least approximately equal to the focal length of the spherical mirror 14, so that there is little or no angular spread between the focused sub-beams 48 incident on the MEMS array 30.

Figure 2:
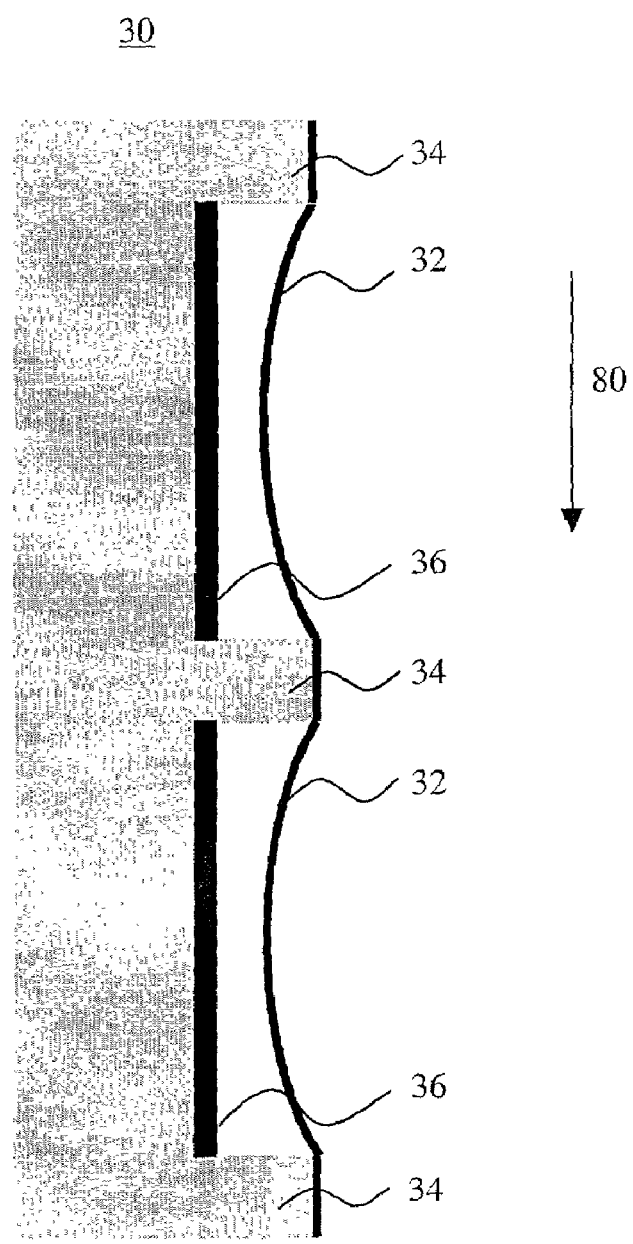
FIG. 2 is a more detailed cross-sectional view of a preferred embodiment of the phase shifter array, in which the phase shifters are deformable membrane mirrors.

Referring now to FIG. 2, the MEMS array 30 consists of a plurality of flexible reflective membranes 32, each attached to anchor points 34 along the two sides transverse to the linear dispersion direction. The cross-sectional profile of each membrane 32 is substantially constant along a direction transverse to the linear dispersion direction. The MEMS array 30 is positioned such that the focused spots corresponding to the channel center frequencies are located at least approximately at the centers of the membranes, and the anchor points 34 are between the channel centers. Electrodes 36 are located under each membrane 32, and the membranes 32 are separately and controllably deformed by varying the voltage on the electrodes 36 to adjust the electrostatic attraction between membrane 32 and electrode 36. A control means 38 is electrically coupled to the electrodes 36 and membranes 32 to effect the controllable deformation. The anchor points 34 and electrodes 36 are supported by a substrate 37.

Figure 3:
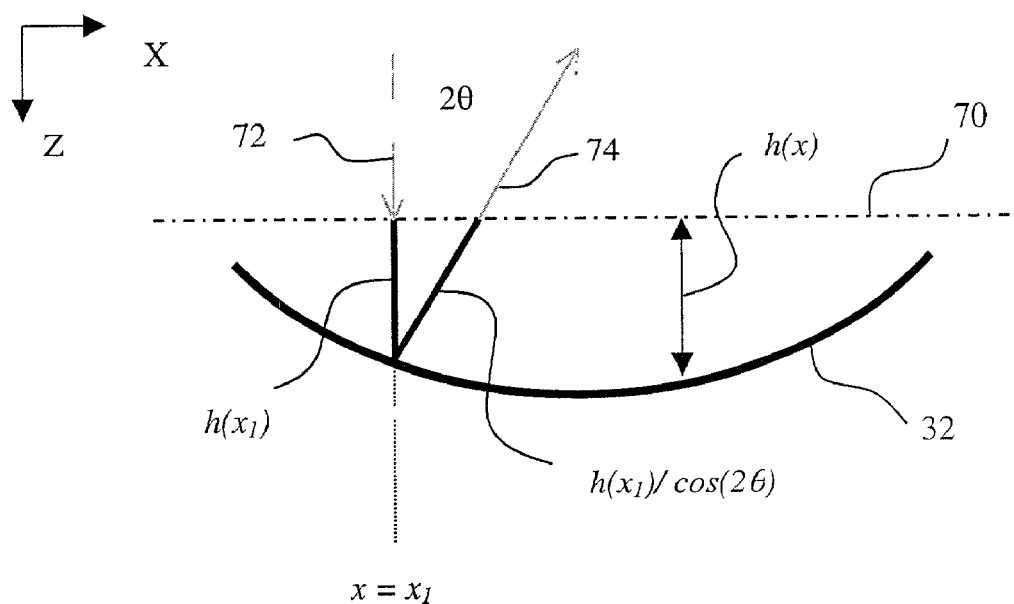
FIG. 3 is a schematic illustration of optical ray paths at the reflective phase shifters.

The function of the MEMS array 30 is to impart a frequency dependent phase shift across each channel. The amount of phase shift can be derived from the cross sectional profile of the MEMS membrane 32, as illustrated in FIG. 3.

Let x be a linear coordinate along the linear dispersion direction, and let z be a linear coordinate along the direction of incidence of the focused sub-beams 48. Consider a reference plane 70 located just above the MEMS membrane 32, and perpendicular to z. Let the function h(x) be the distance in the z direction from the reference plane 70 to the MEMS membrane 32. An optical ray 72 of wavelength $\lambda_1$ incident on the reference plane 70 at position $x=x_1$ will travel a distance $h(x_1)$ from the reference plane 70 to the MEMS membrane 32. At the MEMS membrane 32, the incident ray 72 will be reflected through an angle $2\theta(x_1)$, where $\theta(x)=dh(x)/dx$ is the local slope of the MEMS membrane 32 at $x=x_1$. The reflected ray 74 will then travel a distance $h(x_1)/\cos(2\theta(x_1))$ from the MEMS membrane 32 back to the reference plane 70. The optical phase of the reflected ray 74 at the reference plane 70 relative to the optical phase of the incident ray 72 at the reference plane 70 is then $(2\pi n h(x_1)\lambda_1)*(1+1/\cos(2\theta(x_1)))$, where n is the refractive index of the medium between the reference plane 70 and the MEMS membrane 32. The angle $2\theta$ is typically small, so the quantity $1/\cos(2\theta)$ is approximately equal to 1, and the optical phase shift can be approximately written as $4\pi n h(x_1)/\lambda_1$.

Thus, for a frequency component incident at position x, the phase shift is proportional to h(x), the group delay is proportional to the first derivative $dh(x)/dx$, and the chromatic dispersion is proportional to the second derivative $d^2h(x)/dx^2$. For compensation of chromatic dispersion across one channel, the preferred membrane 32 profile has a constant second derivative, i.e. a parabolic profile. However, an arbitrary phase shift as a function of frequency can be generated with an appropriate MEMS membrane 32 profile h(x).

The path of a sub-beam from the input fiber to the MEMS array will be referred to as the "nominal path". In FIG. 1, the nominal path for a sub-beam consists of the sequence of beam paths of 40, 42, 44, 46, and 48. The angle $2\theta(x)$ between the incident and reflected sub-beams at the MEMS array will be referred to as the "angular deviation". A sub-beam traveling from the optical fiber to the MEMS array will be described as traveling in the "forward" direction, and a sub-beam traveling from the MEMS array to the optical fiber will be described as traveling in the "backward" direction.

Figure 4:
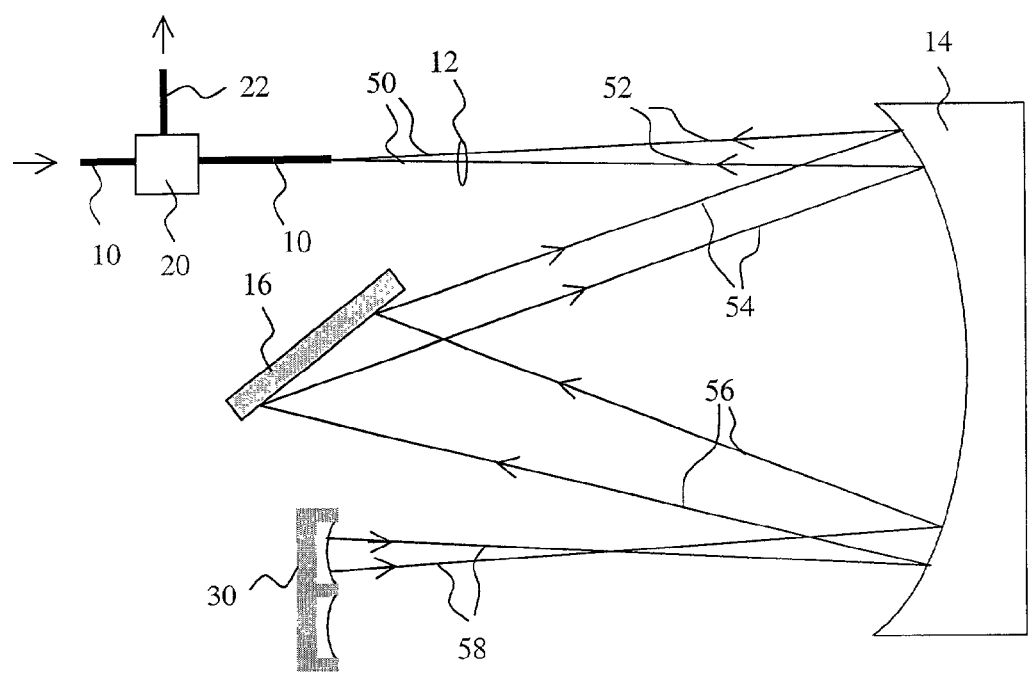
FIG. 4 is a schematic diagram of the preferred embodiment of FIG. 1, showing representative light paths for light returning from the array of phase shifters to the optical fiber.

Referring now to FIG. 4, the plurality of linearly dispersed sub-beams 58 reflected from the MEMS array 30 are re-collimated by the spherical mirror 14, and the re-collimated sub-beams 56 are directed towards the grating 16. The spherical mirror 14 converts the linear dispersion of focused sub-beams 58 back to an angular dispersion of collimated sub-beams 56. However, the angular deviation of each backward traveling sub-beam 58 relative to its nominal path results in a linear displacement of the collimated sub-beam 56 relative to its nominal path. Thus, between the spherical mirror 14 and the grating 16, each backward traveling sub-beam 56 is parallel to but possibly displaced from its nominal path.

The plurality of angularly dispersed collimated sub-beams 56 incident on the grating 16 is transformed to a plurality of parallel but linearly displaced collimated sub-beams 54 upon reflection from the grating 16. The plurality of sub-beams 52 reflected from the spherical mirror 14 is focused into the optical fiber 10 by the combination of the spherical mirror 14 and micro-lens 12. The angle of incidence of each focused sub-beam 50 into the optical fiber 10 is proportional to the angle of deviation of the reflected sub-beam 58 at the MEMS array 30.

An optical circulator 20 is disposed to separate the backward traveling output light from the forward traveling input light in the optical fiber 10. The output light is directed by the circulator 20 into an output optical fiber 22.

There is an excess coupling loss for sub-beams 50 that are focused into the optical fiber 10 at a non-zero angle relative to the nominal path, and the coupling loss increases as a function of the angle of incidence into the fiber 10. For a parabolic MEMS membrane 32 profile h(x), this excess coupling loss results in a rounded optical transmission versus wavelength characteristic. The optical transmission versus wavelength across one channel will be hereinafter referred to as the "channel shape". Furthermore, the bandwidth of the optical transmission decreases as the magnitude of the curvature of the MEMS membrane 32 is increased, i.e. as the magnitude of the chromatic dispersion increases.

Figure 10:
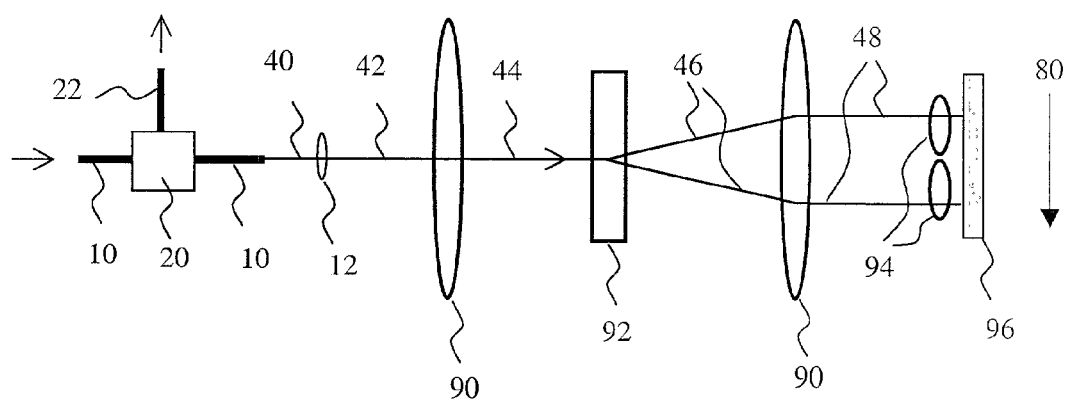
FIG. 10 is a schematic diagram of an alternative embodiment of the chromatic dispersion compensator, wherein the spherical mirror, reflective grating, and reflective phase shifters of FIG. 1 are replaced with transmissive elements.

This foregoing specification has described an embodiment of the invention using reflective optical elements to perform the functions of collimating, dispersing, focusing, and phase shifting the light. Any or all of these functions may instead be performed with transmissive optical elements. FIG. 10 illustrates an embodiment of the invention wherein the collimating and focusing means are lenses 90 instead of spherical mirrors 14, the dispersive means is a transmissive diffraction grating 92 instead of a reflective diffraction grating 16, and the plurality of phase shifters is an array of lenses 94 instead of an array of mirrors 30. A flat mirror 96 is further disposed after the array of lenses 94 to reflect the light back through the lens array 94, the lens 90, diffraction grating 92, lens 90, and micro-lens 12 to the optical fiber 10. The phase shift due to the lens array 94 arises from a variation along the dispersion direction 80 of the optical thickness of the lens array 94. The optical thickness of the lens array 94 is equal to the physical thickness of the lens array 94 times the refractive index of the optical material in the lens array 94.

Figure 11:
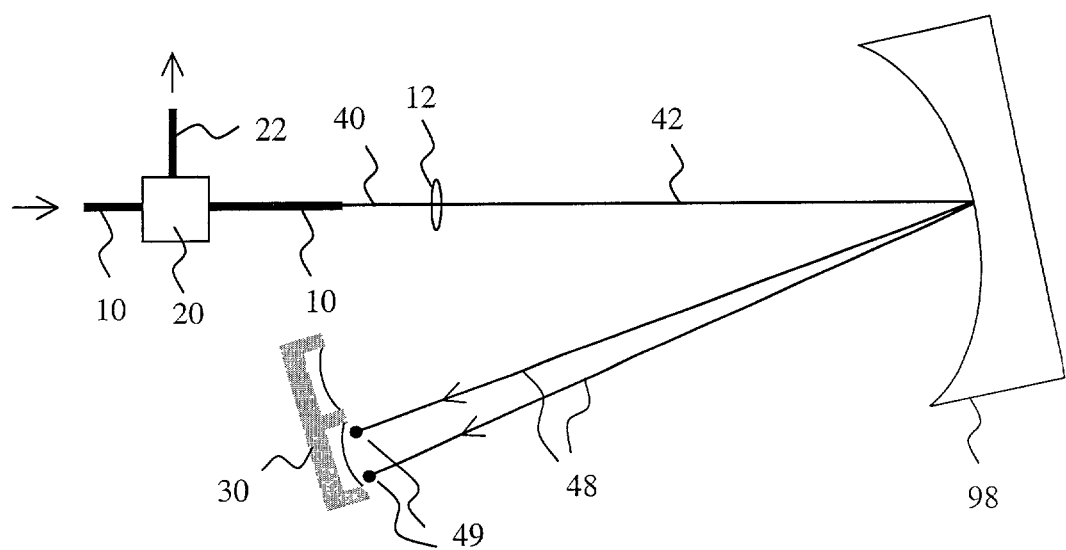
FIG. 11 is a schematic diagram of an alternative embodiment of the chromatic dispersion compensator, wherein the spherical mirror and grating of FIG. 1 are replaced with a concave reflective grating.

In another embodiment, the spherical mirror 14 and reflective diffraction grating 16 may be replaced with a reflective concave diffraction grating 98, as illustrated in FIG. 11. The concave grating 98 both disperses and focuses the incident light beam 42 to a plurality of focused spots 49 corresponding to the optical frequency components of the incident beam 42.

Figure 8:
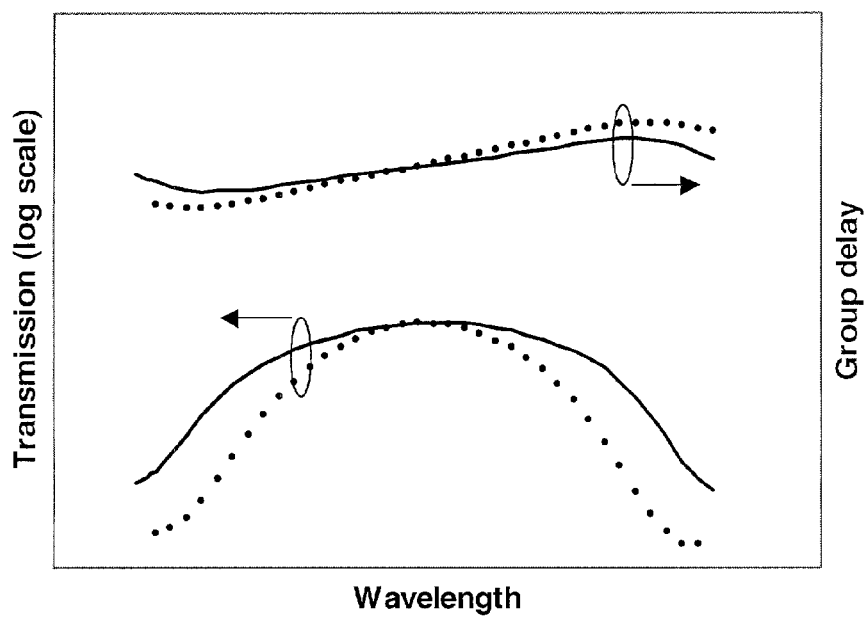
FIG. 8 is a plot of measured optical transmission and group delay for an experimental version of the preferred embodiment of a chromatic dispersion compensator device in which light is reflected once from a phase shifter array.

An experimental single pass dispersion compensator device was built with a 120 mm focal length spherical mirror, 1200 lines/mm reflective diffraction grating, and an array of 20 deformable MEMS membrane reflectors. Optical transmission and group delay of this device were measured with a commercial test set. Measured optical transmission and group delay for one of the 20 channels at two different MEMS electrode voltages are shown in FIG. 8, where the values corresponding to the two different electrode voltage settings are illustrated as solid and dotted lines. A variation of the chromatic dispersion (slope of the group delay vs. wavelength) with applied voltage is evident in FIG. 8. Also, a rounded channel shape and narrowing of the optical transmission bandwidth with increasing chromatic dispersion are evident in FIG. 8.

Dual Pass Dispersion Compensator

The narrow bandwidth at larger chromatic dispersion settings limits the usable chromatic dispersion tuning range of the single pass device. Therefore, we disclose an improved multi-channel chromatic dispersion compensator with widened and flattened channel shape, and increased chromatic dispersion tuning range relative to the single pass chromatic dispersion compensator. The improved chromatic dispersion compensator is referred to as a "dual pass" device, since the optical signal is reflected twice from the MEMS array.

Figure 5:
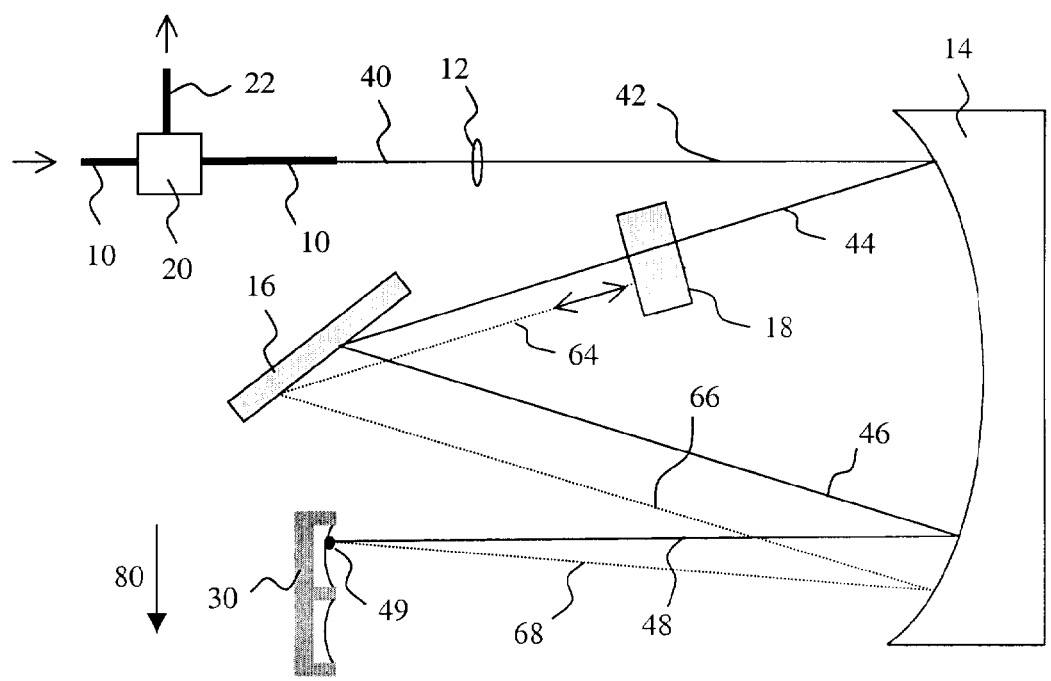
FIG. 5 is a schematic diagram of a preferred embodiment of a chromatic dispersion compensator device in which light is reflected twice from an array of phase shifters, showing representative light paths from an input optical fiber to the array of phase shifters, and then back to a retro-reflector.

In an embodiment of the dual pass chromatic dispersion compensator, illustrated in FIG. 5, the optical path from the input optical fiber 10 to the MEMS array 30 is similar to the corresponding optical path in the single pass device illustrated in FIG. 1. For clarity, the optical path of only one representative sub-beam is shown in FIG. 5. Where required, the illustrated optical path should be understood to represent a plurality of different paths corresponding to sub-beams of different frequency components.

Figure 6:
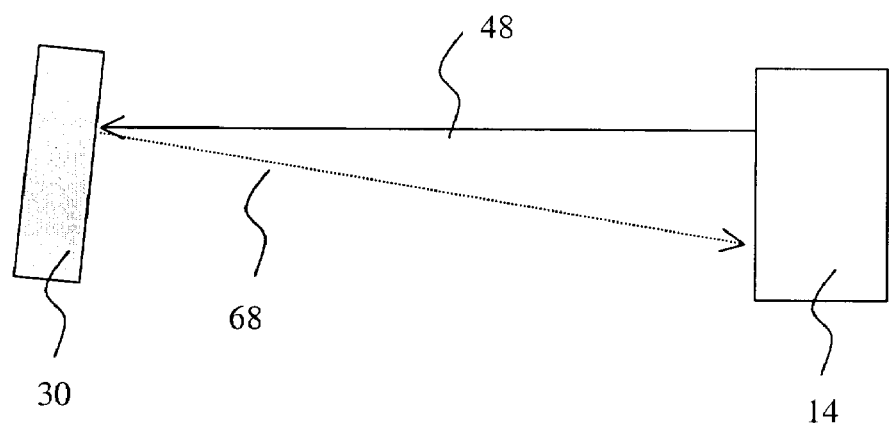
FIG. 6 is a schematic side-view diagram of the embodiment of FIG. 5, showing light paths for the first reflection from the phase shifter array.

For the dual pass device illustrated in FIG. 5, the MEMS array 30 is tilted slightly in a direction transverse to the linear dispersion direction 80, such that the plurality of focused sub-beams 68 reflected from the MEMS array 30 is redirected with an angular displacement relative to the plurality of incident sub-beams 48, with the direction of said angular displacement transverse to the linear dispersion direction 80. This is illustrated in the side view of FIG. 6.

Figure 7A:
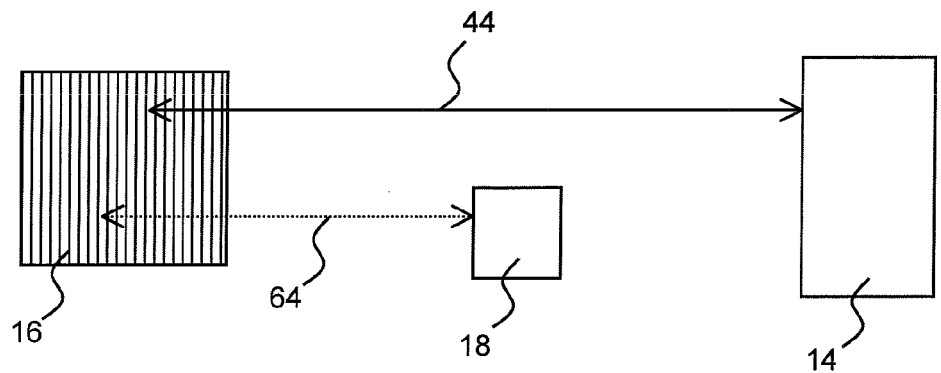
FIG. 7a is a schematic side-view diagram of the embodiment of FIG. 5, showing light paths at the retro-reflector.
Figure 7B:
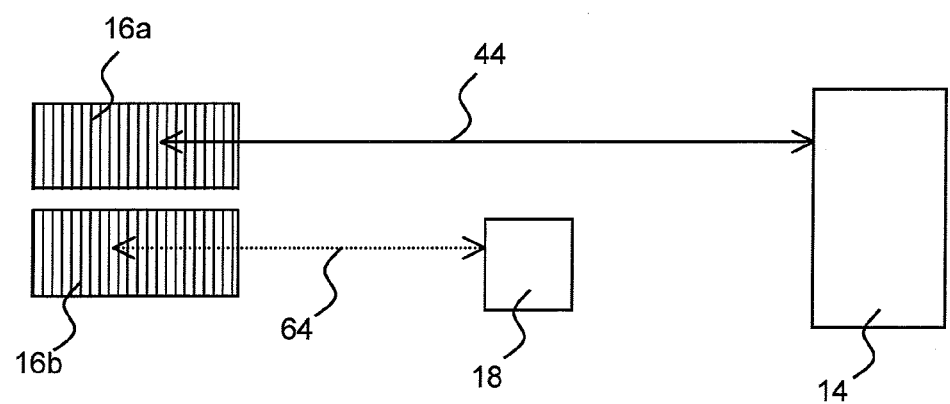
FIG. 7b is a schematic side-view diagram similar to FIG. 7a, wherein two separate dispersive means are utilized.

Referring again to FIG. 5, the plurality of sub-beams 68 reflected from the MEMS array 30 is re-collimated by spherical mirror 14, and the plurality of collimated sub-beams 66 is directed back toward the grating 16. The spherical mirror 14 converts the linear dispersion of focused spots 49 back to an angular dispersion of collimated sub-beams 66. Reflection from the grating 16 removes the angular dispersion, resulting in a plurality of parallel and collimated sub-beams 64. As shown in FIG. 7, the plurality of parallel and collimated sub-beams 64 lie in a plane that is spatially separated from the forward traveling input beam 44. In the illustration of FIG. 7, this separation is in the vertical direction. The spatial separation is due to the aforementioned tilt of the MEMS array 30.

A retro-reflecting element 18 is disposed between the grating 16 and spherical mirror 14 such that the plurality of parallel backward traveling sub-beams 64 is redirected by the retro-reflector, without blocking or otherwise redirecting the forward traveling input beam 44. The plurality of sub-beams 64 is redirected by the retro-reflector 18 back through the grating 16 and spherical mirror 14 to the MEMS array 30, such that following a second reflection from the MEMS array 30, each backward traveling sub-beam is substantially parallel to its nominal path.

In a preferred embodiment, the retro-reflecting element 18 is a plane mirror disposed perpendicular to the plurality of backward traveling parallel sub-beams 64 between the grating 16 and the spherical mirror 14. In this embodiment, each retro-reflected sub-beam retraces its path along 64, 66, and 68 from the retro-reflector 18 back to the MEMS array 30. Each retro-reflected sub-beam is then reflected from the MEMS array 30 for a second time. For this second reflection from the MEMS array 30, the angular deviation imparted to each sub-beam is equal in magnitude and opposite in sign to the angular deviation imparted by the first reflection from the MEMS array 30, such that the two angular deviations mutually cancel and the sub-beam is directed back along its nominal input path after the second reflection from the MEMS array 30. The phase shift imparted to the sub-beams by the second reflection from the MEMS array 30 is equal in sign and equal in magnitude to the phase shift imparted by the first reflection from the MEMS array 30. Thus, the phase shift, group delay, and chromatic dispersion of the dual pass device are substantially doubled compared to a single pass.

Following the second reflection from the MEMS array 30, each sub-beam retraces its nominal path back to the optical fiber 10, following in sequence the optical paths 48, 46, 44, 42, and 40.

Since the second reflection from the MEMS array 30 substantially cancels the angular deviation imparted by the first reflection from the MEMS array 30, there is substantially no angular error for the output beam incident along optical path 40 at the optical fiber 10. As a result, the channel shape is substantially flat-topped for the dual pass device, and the transmission bandwidth is wider for the dual pass chromatic dispersion compensator compared to the single pass chromatic dispersion compensator. The amount of chromatic dispersion obtained with a given MEMS membrane 32 profile h(x) is also doubled for the dual pass device compared to the single pass device.

Figure 12:
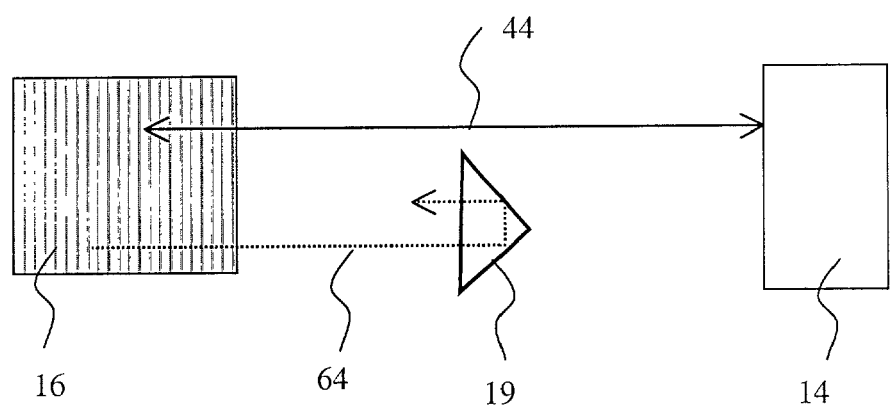
FIG. 12 is a schematic diagram of an alternative embodiment of the chromatic dispersion compensator wherein the flat mirror is replaced with a prism.

An alternative embodiment of the retro-reflector is shown in FIG. 12, wherein the retro-reflector is a prism 19 instead of a flat mirror 18.

Figure 9:
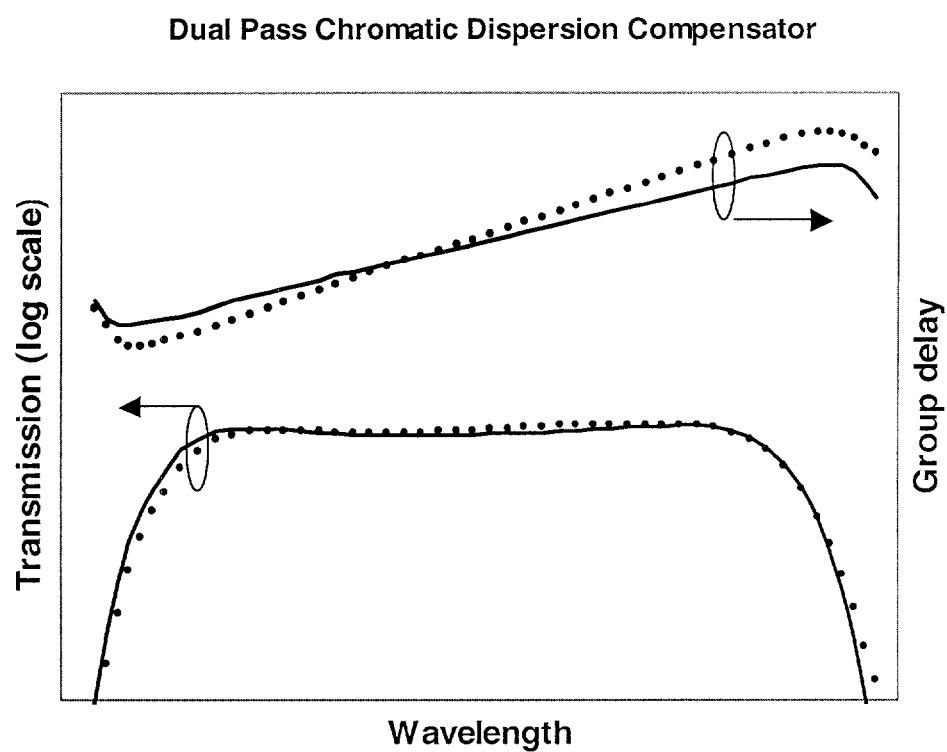
FIG. 9 is a plot of measured optical transmission and group delay for an experimental version of the preferred embodiment of a chromatic dispersion compensator device in which light is reflected twice from a phase shifter array.

An experimental dual pass dispersion compensator device was built with a 120 mm focal length spherical mirror, 1200 lines/mm diffraction grating, and an array of 20 deformable MEMS membrane reflectors. Optical transmission and group delay of this device were measured with a commercial test set. Measured optical transmission and group delay for one of the 20 channels at two different MEMS electrode voltages are shown in FIG. 9, where the values corresponding to the two different electrode voltage settings are illustrated as solid and dotted lines. A variation of the chromatic dispersion (slope of the group delay vs. wavelength) with applied voltage is evident in FIG. 9. A substantially flat topped channel shape for the dual pass device is evident in FIG. 9, and the transmission bandwidth is wider than for the single pass device shown in FIG. 8.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

The invention claimed is:

1. A chromatic dispersion compensator comprising:
   a) an input port for inputting an input optical signal,
   b) a first dispersive means optically coupled for spatially separating the input optical signal into spatially spaced frequency components,
   c) at least one phase shifter optically coupled for imparting a phase shift to a range of the spatially spaced frequency components,
   d) a second dispersive means optically coupled for recombining the spatially spaced frequency components into a first output signal,
   e) a retroreflecting means coupled to redirect the first output signal back to the second dispersive means to undergo a second pass to the at least one phase shifter and a second pass to the first dispersive means to produce a second output signal, and
   f) an output port for outputting the second output signal,
   wherein an input signal is directed to the first dispersive means, the spaced frequency components are directed to the at least one phase shifter, the phase-shifted components are directed to the second dispersive means to produce a first output signal which is redirected by the retroreflecting means for a second pass to the second dispersive means, the phase shifter, the first dispersive means and to the output port.

2. The chromatic dispersion compensator of claim 1 wherein the first and second dispersive means is a single dispersive means.

3. The dispersion compensator of claim 1 wherein the at least one phase shifter is a plurality of separate phase shifters.

4. The compensator of claim 3 wherein each separate phase shifter is for imparting a phase shift to a channel containing a range of the spatially spaced frequency components.

5. The compensator of claim 1 further comprising
   g) a collimating element coupled for collimating the input signal onto the first dispersive means, and
   h) a focusing element coupled for focusing the spatially separated frequency components from the first dispersive means onto the at least one phase shifter.

6. The dispersion compensator of claim 5 wherein the collimating element is a spherical mirror.

7. The compensator of claim 5 wherein the focusing element is a spherical mirror.

8. The compensator of claim 5 wherein the collimating element and the focusing element is the same spherical mirror.

9. The compensator of claim 1 wherein the retroreflecting means is a prism.

* * * * *